N. R. NEWSHOLME.
DOFFING MECHANISM FOR SPINNING FRAMES.
APPLICATION FILED JAN. 5, 1910.

989,183.

Patented Apr. 11, 1911.

3 SHEETS—SHEET 1.

WITNESSES

INVENTOR
Norman Robert Newsholme

N. R. NEWSHOLME.
DOFFING MECHANISM FOR SPINNING FRAMES.
APPLICATION FILED JAN. 5, 1910.
989,183.
Patented Apr. 11, 1911.
3 SHEETS—SHEET 2.
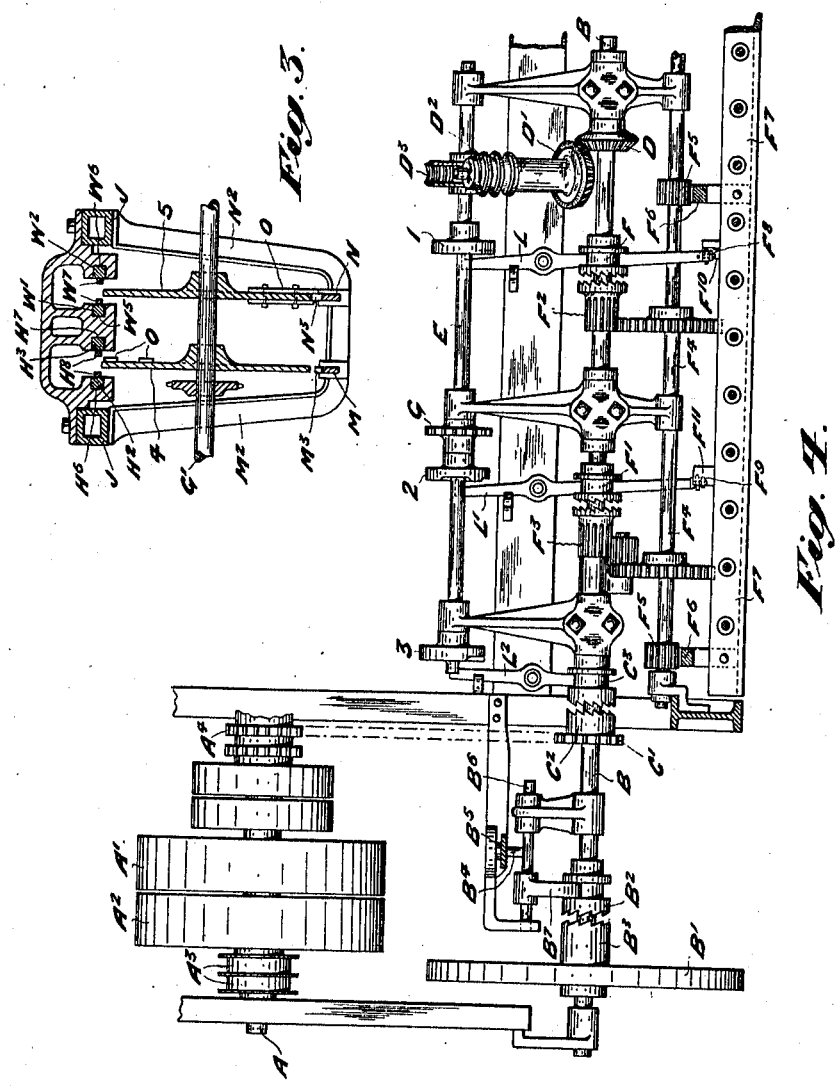
WITNESSES
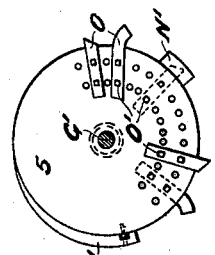
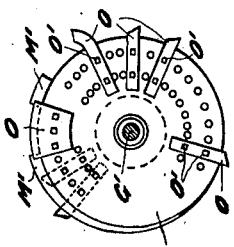
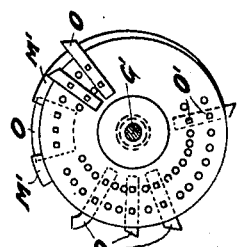
INVENTOR
Norman Robert Newsholme
By
ATTY N. R. NEWSHOLME.
DOFFING MECHANISM FOR SPINNING FRAMES.
APPLICATION FILED JAN. 5, 1910.
989,183.
Patented Apr. 11, 1911.
3 SHEETS—SHEET 3.
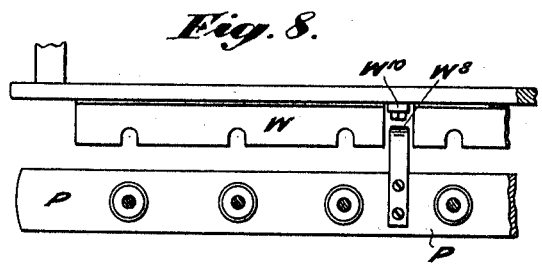
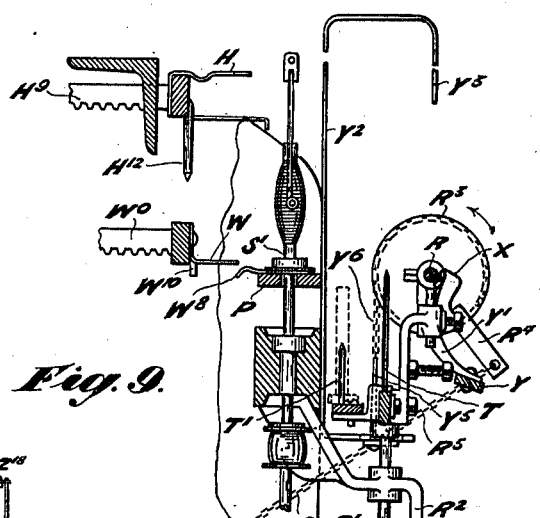
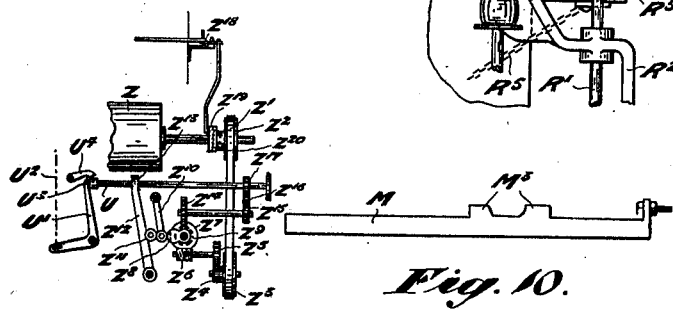
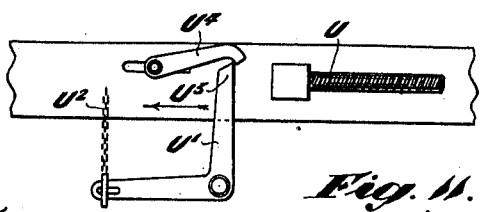
WITNESSES
W. P. Burke
John A. Percival
INVENTOR
Norman Robert Newsholme.
By
ATTY

UNITED STATES PATENT OFFICE.

NORMAN ROBERT NEWSHOLME, OF KEIGHLEY, ENGLAND.

DOFFING MECHANISM FOR SPINNING-FRAMES.

989,183.  Specification of Letters Patent.  Patented Apr. 11, 1911.

Application filed January 5, 1910. Serial No. 536,525.

*To all whom it may concern:*

Be it known that I, NORMAN ROBERT NEWSHOLME, of Southlands, Keighley, in the county of York, England, spinner, subject of the King of Great Britain and Ireland, have invented certain new and useful Improvements in Doffing Mechanism for Spinning-Frames, of which the following is a specification.

This invention relates to improvements in doffing mechanism for spinning frames, my object being to arrange and construct a doffing mechanism which will be automatic in its action and comparatively simple, as regards its construction. Automatic doffers are known which employ a series of cams and levers and gearing connected with clutches, operated from the said cams or levers at the desired time, but I have found it desirable, as regards some movements, to discard some of the cam, lever and clutch movements and to employ a more direct method, which will simplify the movements and be less costly to construct.

In describing my invention in detail, reference is made to the accompanying sheets of drawings whereon similar letters and numerals will as far as possible indicate similar parts.

Figure 1:
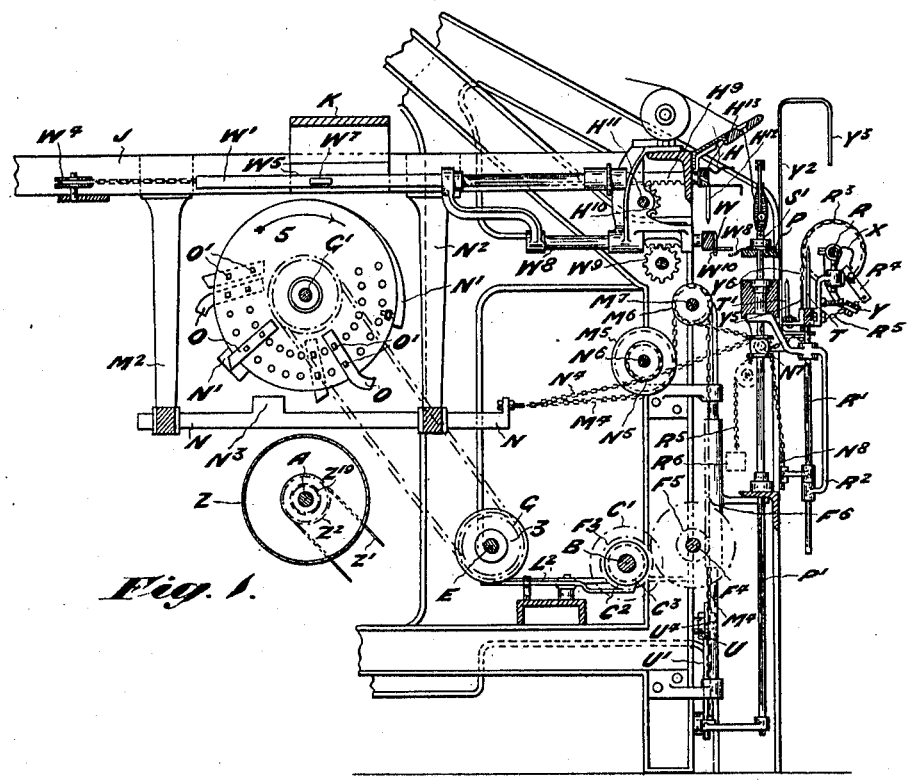
Figure 2:
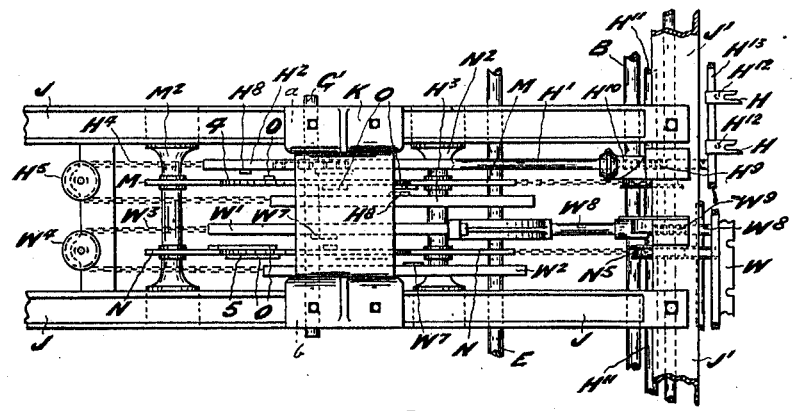

Figure 1 represents a part cross sectional elevation, showing the major portion of the doffing mechanism. Fig. 2. represents a plan. Fig. 3. shows a section on line $a$—$b$, Fig. 2. Fig. 4. shows a plan of the cam operated mechanism. Figs. 5, 6 and 7 are details of finger disks hereinafter referred to. Fig. 8 is a plan of a portion of a bobbin or like rest. Fig. 9 is a sectional elevation, showing the thread severing mechanism. Fig. 10. is a view of an operating bar, hereinafter described. Fig. 11. is a detail of mechanism for holding up the lifter rail, and Fig. 12. is a detail of lifter mechanism clutch gear.

In carrying out my invention, I will first describe those movements which are previously known in my British Patent No. 5135 of 1909 and which comprise only a portion of the movements required. The arrangement of this mechanism is shown in plan, in Fig. 4. and same, as all the hereinafter described mechanism, is only shown and described as adapted to one side of a spinning frame.

A is the main or ordinary shaft, which drives the frame.

$A^1$ and $A^2$ are the usual fast and loose pulleys; revolving with loose pulley $A^2$ are two pulleys or like $A^3$ for driving the mechanism at either side of the frame. A belt, chain or like transmits motion during doffing (that is when the driving belt is on the loose pulley $A^2$ and the spinning mechanism is at rest) to another pulley or the like $B^1$, mounted on main doffing shaft B and by preference free to revolve thereon.

On the shaft A and revolving therewith during spinning is mounted a chain or like wheel $A^4$, connected by chain or like to a freely revolving wheel $C^1$ (on shaft B) carrying thereon one member $C^2$ of a clutch. The object of this mechanism is to enable the spinning mechanism to be actuated at a certain time, or times, back from the main doffing shaft B, as will be hereinafter described.

On shaft B is a slidably mounted clutch member $B^2$, capable of engaging clutch member $B^3$ on wheel or pulley $B^1$, and when the clutch members are in engagement the main shaft B will be driven. The clutch member $B^2$ is put into gear by means of a lever $B^4$ attached to the ordinary setting on rod by means of lever $B^5$, sliding rod $B^6$ carrying arm $B^7$ which engages the member $B^2$, thus during spinning the doffing shaft B and therefore the doffing mechanism is at rest, and during doffing the shaft B is actuated and with the exception of the movements through wheel $C^1$ hereinafter described the spinning mechanism is stationary.

On shaft B is mounted a bevel wheel D, which engages a bevel wheel $D^1$ carrying a worm $D^2$, which engages worm wheel $D^3$ on cam shaft E on which are mounted 3 cams, numbered 1, 2 and 3; said cams are shown in the form of face cams and with each cam engages one end of a lever, preferably pressed toward the cam by means of a suitable spring. Each lever beyond its pivot engages a clutch member slidably mounted on, but revolving with shaft B, as will be seen from Fig. 2. Thus cam 1, has lever L engaging clutch member F. Lever $L^1$ of cam 2 engages clutch member $F^1$, and, cam 3 has lever $L^2$ engaging clutch member $C^3$. Clutch members F and $F^1$ engage loose gear pinions $F^2$ and $F^3$ respectively and transmit motion when in gear to shaft $F^4$, cam 1 and its levers and clutch in one direction, and cam 2 in another, an intermediate wheel being employed for this purpose. The shaft $F^4$ carries thereon pinions $F^5$ which engage racks $F^6$ on step rail $F^7$, whereby the said step rail is raised and lowered at the desired times. In order that the levers L and $L^1$ may be positively returned to their normal position, same are extended and terminate in bowls $F^8$ and $F^9$, and cams or projections $F^{10}$ and $F^{11}$ on step rail $F^7$ actuate same in the manner described in my before mentioned British patent. Cam 3 is to actuate the spinning mechanism, back from the doffing mechanism, to provide a slack in the yarn when the full bobbins or spools are carried forward and thus avoid tension in the yarn or the like and consequently broken ends. On shaft E is mounted a chain wheel or like G from which motion is transmitted to an auxiliary shaft $G^1$, Figs. 1 and 3. On this shaft are mounted two disks 4 and 5 and through the medium of these disks, practically all the other doffing movements are made.

The disks 4 and 5 I term adjustable finger disks, as same are provided on either side with fingers O and the disks are by preference provided with a series of apertures, threaded if desired for the reception of studs or bolts $O^1$, whereby the fingers may be attached to the disks and their positions varied or adjusted, as will be seen from Figs. 1, 5, 6 and 7 which give front and back view respectively of each disk, the fingers take varying forms depending on the length or duration of movement each is to actuate. The fingers O are required to actuate sliding rods $H^2$ and $H^3$ mounted adjacent to and above disk 4, and rods $W^1$ and $W^2$ mounted adjacent to disk 5. Each pair of rods is connected by means of chains or the like $H^4$ and $W^3$ which pass around pulleys $H^5$ and $W^4$ carried by the supporting beams or the like J. J. which are attached to the ordinary angle iron frames $J^1$ of the spinning frame. The frames or like J. J. carry a supporting member K provided with slides $H^6$ and $H^7$ and $W^5$ and $W^6$ for the reception of rods $H^2$, $H^3$, $W^1$ and $W^2$, each of these rods is provided with studs or projections $H^8$ and $W^7$, which are pressed by the fingers as the disks 4 and 5 revolve and thus the rods are moved in one direction or the other by means of the fingers and projections.

In addition to fingers on the sides of the disks 4 and 5 the peripheries of the said disks are provided with cam like projections $M^1$ on disk 4 and $N^1$ on disk 5; these projections may be made adjustable on the disk peripheries by means of adjusting or like screws, and same are for actuating sliding bars M and N carried in brackets $M^2$, $N^2$ from the frame J, J, and provided with upstanding projections $M^3$, $N^3$, for engaging the cam like projections $M^1$, $N^1$, whereby the said bars are actuated. The disks 4 and 5 will travel in the direction of the arrow Fig. 1. The bars M and N are shown in Figs. 1, 2 and 10. The sliding rod $H^2$ has connected thereto a bar $H^1$ provided with rack $H^9$ for engaging pinion $H^{10}$, and the bar $H^1$ carries the flier holder H and bobbin removing peg $H^{12}$, the movement of rod $H^2$ will actuate the pinion $H^{10}$ carried on a shaft $H^{11}$ (which is provided at intervals with pinions, engaging with racks carried from the bar on which the holder H is mounted) and will thus press out or draw in holder H and bobbin removing peg $H^{12}$.

To the rod $W^1$ is attached an operating racked bar $W^9$ which engages pinion $W^9$ similarly arranged to pinion $H^{10}$ and the rod or bar $W^9$ is attached to the wedge bar W which will pass at the desired times under the base of spool or like $S^1$ and so hold same at the base, the upper end being held on bobbin removing peg $H^{12}$ on flier holder bar $H^{13}$.

The bar M is for actuating the lifter plate P from rods $P^1$, and is connected to the said rods by means of a chain $M^4$ passing under loose guide pulley $M^5$ and around and over pulley $M^6$ mounted on shaft $M^7$ which will be provided with other similar pulleys, carrying lifting chains or the like connected to the other lifter bar rods.

When the lifter plate P has been lifted, it is desirable to employ some means for preventing same from dropping by its own weight as is its tendency. The lifter mechanism to which this catch is intended to be applied and which is the form I prefer, comprises a lifter shaft U, Fig. 11, which during spinning actuates a bell crank lever $U^1$ to and fro, the chain $U^2$ leading from said lever $U^1$ operating the lifter bars and plate, as the end $U^3$ of lever $U^1$ is moved in the direction of arrow in Fig. 11, during doffing, and under the action of the bar M a catch $U^4$ drops into engagement with the end $U^3$ and holds same up. During spinning the end of shaft U releases the lever $U^1$ and the catch will rest on the block or end of shaft U. During spinning the catch or lever $U^1$ and end of shaft U are in engagement until lifter lowers to a point when catch $U^4$ will slide over the top of upright arm of the bell crank lever, therefore the catch is in no way detrimental to the lifter motion during spinning. During doffing the lifter motion is disconnected by means of a clutch, connected to the setting-on rod of the spinning frame and is so arranged, that when the frame (which is fitted with a well known knock-off motion) knocks off, the clutch is thrown out of gear when the bobbin is at the bottom of the pick.

Figs. 1 and 12 show the lifter knock off motion. The lifter mechanism is driven from the tape drum Z in the usual manner, by means of belt $Z^1$ on pulley $Z^2$, which communicates motion to another pulley $Z^3$ carrying pinion $Z^4$, engaging pinion $Z^5$, carrying a worm $Z^6$ engaging worm wheel $Z^7$ which operates cam $Z^8$ and worm $Z^9$, cam $Z^8$ moves oscillating lever $Z^{10}$, which engages bowl $Z^{11}$ on lever $Z^{12}$, which carries a threaded block $Z^{13}$ engaging screw shaft U, the worm $Z^9$ engages worm wheel $Z^{14}$ carrying on its shaft pinion $Z^{15}$ which engages intermediate pinion $Z^{16}$ which in turn engages pinion $Z^{17}$ on ordinary lifter screw shaft U. The knock-off bar $Z^{18}$ is connected to the ordinary setting-on rod and engages a clutch member $Z^{19}$ held in gear with a clutch member $Z^{20}$ on pulley $Z^2$ during spinning, but drawn out of gear during doffing and thereby freeing the lifter mechanism and allowing same to be operated by the doffing mechanism.

It will be understood by those skilled in the art, that finger disks and their mechanism may be readily adapted to both sides of a spinning frame.

The bar N is for actuating the front rail or shaft R which carries the yarn or like severing device Y and two peg rails T. $T^1$, one set of pegs having thereon the empty spools or the like, the other set being for the reception of the full spools when doffed. Chain or like $N^4$ leads from bar N over and around pulley $N^5$ on shaft $N^6$ (which is provided with other and similar pulleys where required) then over guide pulley $N^7$ to the foot $N^8$ of the front rail mechanism R, Fig. 1, the said front rail being carried by a series of sliding shafts $R^1$ mounted in brackets $R^2$.

At the desired time the front rail or shaft R will be raised through the means before described and on this shaft is mounted a pulley or like $R^3$ and to the said shaft are attached the levers or like $Y^1$ which hold the severing bar Y. A bracket (or brackets) $Y^2$ is attached to the machine frame preferably at one or both sides thereof and such bracket is turned over at $Y^3$, and at $Y^4$ carries a peg or stud $Y^5$ from which a chain or like $Y^6$ leads to pulley $R^3$ in order that the shaft R may be revolved as same is raised, the peg or stud $Y^5$ being stationary. An arm or lever $R^4$ is attached to pulley $R^3$ and same has connected thereto a chain $R^5$ provided with weight $R^6$.

As shaft R is raised the severing bar Y turns over in the direction of the arrow in Fig. 9, and said bar will rest against projection $Y^3$ and in this position the severing bar is past the center of the shaft R and the tendency of the weight $R^6$ is therefore to pull the severing device over toward the spindles, but the projection $Y^3$ prevents this. When however, the shaft or front rail R falls, the severing bar Y may fall over toward the spindles and sever the yarn or thread.

A spring X is mounted on shaft R opposite each spindle, and as shaft R is revolved such spring will engage the full bobbin on peg T and wedge same somewhat, so that the turning of the bobbin is prevented as the cutter bar Y comes over to sever the thread or yarn.

In order that the wedge bar W may pass under the base of the full bobbins, the lifter plate P is provided with a series of projections $W^8$, and recesses $W^9$ are formed in the bar W into which the projections $W^8$ may pass and press against projections $W^{10}$ on bar W and so tilt the lifter plate P, see Figs. 1, 8 and 9.

The operation of the device is as follows: The spinning frame having automatically knocked off and driving belt having passed on to loose pulley $A^2$ the setting-on rod is operated to cause the clutch member $B^2$ to engage with revolving clutch member $B^3$ and thus set the doffing mechanism into motion, cam 3 first comes into operation for a short time and consequently the spindles are revolved. But as cam 3 comes into operation the disks 4 and 5 are being actuated, and as the spindles are being revolved the flier holder H is actuated through the fingers on disk 5 actuating the sliding rod $H^2$ gearing connected therewith, the flier holder therefore moves forward and passes under the fliers, the differing lengths of the arms of the said holder insuring the flier being turned across the holder at the required angle. The spindle or step rail $F^7$ is now lowered through the medium of cam 1, and its mechanism, and this leaves the fliers on the flier holders. Then a further movement of disk 5 causes the flier holder to travel farther out until the bobbin remover peg $H^{12}$ is over the full bobbin. Disk 4 now operates, by means of cams $M^1$ on the periphery thereof, bar M, and raises the lifter rail or plate P and the wedge bar W is moved forward by the operation of disk 4 and fingers thereon, and the lifter plate is tilted by means of the projections $W^8$ before described, this allows the wedge bar W to pass under the flange or base of bobbins $S^1$ and as the lifter plate has moved up, the bobbin is held by peg $H^{12}$ and bar W, the lifter plate P and spindle rail $F^7$ are now lowered simultaneously by means of the operation of disk 4 and cam 1. The flier holder H and wedge bar W carrying the full bobbins, move forward simultaneously through the action of disks 5 and 4 respectively, until the bobbin is over the peg T connected to front rail or shaft mechanism. A further movement of disk 4 causes the wedge bar to be withdrawn and the full bobbin drops on to peg T. The empty bobbins are held on peg $T^1$. The front rail or like mechanism is raised through the action of cams $N^1$ on disk 5 and the movement of bar N, and as this movement takes place shaft R is revolved through the action of pulley R³. The disk 5 at the same time moves the flier holder back until pegs H¹² are over the pegs T¹. Then the front rail mechanism is further raised through cams N¹ on disk 5 and the empty bobbins are pushed up on to pegs H¹² and the wedge bar W is brought forward till the empty bobbins rest between same and pegs H¹². The front peg rail then drops until the pegs T¹ are clear of the wedge bar W. The wedge bar and flier holder now move back together until the empty bobbin is over the spindle. The wedge bar W then moves back and the empty bobbin drops on to the spindle. The flier holder is then moved back until the flier is over the spindle. The spindle rail then moves up as does the lifter plate, until the spindle engages the flier. The flier holder then returns to its original position and practically at the same time the cam 3 causes the spinning mechanism to be operated, this insures the flier resting in its notch or like in the spindle and a wrap or two of yarn is made around the flier and bobbin. The front peg rail is now allowed to drop and the cutter bar comes over owing to the bar Y³ no longer holding same up. The spring X holds the full bobbin and the yarn or like is severed between the cutter bar and the lifter plate or the like. The lifter mechanism is then adjusted by hand and the spinning mechanism set in motion in the ordinary manner.

It will be understood that when cam 3 is operated a certain amount of slack will be given to the yarn and this slack enables the full bobbins to be moved forward without the danger of severing the yarn or the like.

What I claim as my invention is:—

1. An automatic doffing apparatus for spinning frames comprising a shaft having clutches thereon, a main shaft, means for driving the first mentioned shaft from the main shaft, means for driving the main shaft from the other shaft at certain moments during doffing, a cam shaft, cams thereon, levers operated by said cams to actuate the clutches, a step rail, means for operating the same from the clutch-shaft, finger disks operatively connected with the cam shaft and automatic doffing means operated by said disks.

2. In an automatic doffing apparatus for spinning frames comprising rotary disks, adjustable fingers thereon, connected operated mechanism actuated by said fingers, and automatic doffing means actuated by said operating mechanism.

3. An automatic doffing apparatus for spinning frames comprising rotary disks, adjustable fingers thereon, slidable bars actuated by said fingers and automatic doffing means operated by said bars.

In witness whereof, I have hereunto set my hand, in the presence of two witnesses.

NORMAN ROBERT NEWSHOLME.

Witnesses:
CLIVE WAUGH.
JOSEPH F. KIRBY.